(12) United States Patent
Bates et al.

(10) Patent No.: US 6,727,929 B1
(45) Date of Patent: Apr. 27, 2004

(54) AUTOMATIC DETERMINATION OF NEAREST WINDOW CONTROLLER HAVING A FUNCTION CONSISTENT WITH MOTION OF CURSOR

(75) Inventors: Cary Lee Bates, Rochester, MN (US); Steven Paul Jones, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 09/638,832

(22) Filed: Aug. 16, 2000

(51) Int. Cl.⁷ .................................................. G09G 5/00
(52) U.S. Cl. ...................... 345/862; 345/856
(58) Field of Search .................... 345/857, 858, 345/862, 856, 859–861

(56) References Cited

U.S. PATENT DOCUMENTS

| | | | |
|---|---|---|---|
| 5,808,604 A | * 9/1998 | Robin | 345/862 |
| 5,956,031 A | * 9/1999 | Berteig et al. | 345/764 |
| 6,137,487 A | * 10/2000 | Mantha | 345/767 |
| 6,362,842 B1 | * 3/2002 | Tahara et al. | 345/856 |

OTHER PUBLICATIONS

Screen Dumps of Microsoft Windows 4.0 (pp. 1–2, 1998).*

* cited by examiner

Primary Examiner—Kristine Kincaid
Assistant Examiner—Le Nguyen
(74) Attorney, Agent, or Firm—Karuna Ojanen

(57) ABSTRACT

In a computer windowing operating environment: a method, apparatus, and program product to select the appropriate window controller corresponding the motion of the window cursor. A user will activate a first window controller by clicking on a mouse or other input means and then may drag the window cursor/arrow some distance across the window. In accordance with features of the invention, the original position and the motion of the cursor/arrow are recorded. If the motion is inconsistent with the first controller associated with the original position of the cursor/arrow, a next controller is selected and evaluated as controlling a function consistent with the motion. The process is repeated until a controller within a threshold distance of the original position accepts the motion as being consistent with its functions. Data of the original position and the cursor/arrow motion is passed to the accepted window controller and that window controller then assumes control of the window.

10 Claims, 5 Drawing Sheets

AUTOMATIC DETERMINATION OF NEAREST WINDOW CONTROLLER HAVING A FUNCTION CONSISTENT WITH MOTION OF CURSOR

TECHNICAL FIELD

This invention relates generally to computers and computer software and more particularly relates to differentiating an intended movement when moving a cursor in a windows user interface environment.

BACKGROUND OF THE INVENTION

A very common interface for a user to interact with her/his computer system is the windows environment. Prior to windows, a user would interact with a computer by typing and entering text, as in the DOS systems of years ago. Now windows, first developed at Xerox PARC, have become ubiquitous. A window is usually a rectangle or square that is displayed on the computer screen or monitor in which the functions of a software program are contained within the boundaries of the rectangle/square. The window may contain text, images, and other content and a user will select a specific function or feature of the program by moving a mouse or other pointer device which in turns moves a cursor, an arrow, or other visual display across the window. More than one window may be open at a time which means that more than one software application may be executing or waiting for input/output; also an application itself may have several layers of windowing. Using multiple open windows, a user can efficiently view and/or operate on the content contained in each window. For example, a first window may provide an interface for a word processing document while a second window may contain another word processing document or a spreadsheet or a presentation being developed by other software; a third window may contain an Internet browser and a fourth window may have the interface for an electronic mail program, etc. Thus, the user can view the content in any of the windows while simultaneously acting out functions associated with any other window. Windows may be stacked one on top of the other or windows may be minimized which means the application is open in the background but the window itself is only visible in a task bar which frames part of all of a display.

An experienced windows user frequently opens and closes and resizes many windows during her/his session of resizing multiple windows. What actually happens sometimes, is that the user may have moved the cursor to the edge of a scroll bar and vertically move the cursor along the edge intending to scroll the contents of the window but instead the user accidentally activates the resize controller instead of the scroll bar. Alternatively, the opposite can happen. A user may wish to resize the window but the computer mistakenly interprets the cursor/arrow motion to scroll through the content of a window.

There is thus a need in the industry to differentiate between windowing events especially when the event occurs in close proximity to two or more windowing functions.

SUMMARY OF THE INVENTION

These needs and others that will become apparent to one skilled in the art are satisfied by a method to select a window controller when a user is moving a cursor/screen arrow in a computer window display having at least one window, the method comprising the steps of moving the cursor/screen arrow to an original position; activating a first controller; moving the cursor/arrow in a direction inconsistent with a function controlled by the first controller; activating the next nearest controller; determining if the direction of motion of the cursor/arrow is consistent with a function of the next nearest controller; and repeating the steps of activating the next nearest controller and determining if the direction of motion of the cursor/arrow is consistent with that controller until the direction of motion of the cursor/arrow is consistent with a function of the next nearest controller; and selecting the next nearest controller to control the at least one window.

The inventive method may further comprise saving the original position of the cursor/arrow when the first controller was activated; and saving the time and/or movement of the cursor/arrow during the step of moving the cursor/arrow in a direction inconsistent with a function controlled by the first controller. The method may also comprise the step of determining if the next nearest controller is within a threshold distance of the original position. In addition, the method may comprise the steps of passing the original position and saved time and/or movement to the next nearest controller; and displacing the original position as if it were just within the boundary of the next nearest controller nearest to the original position. The method may also comprise the step of clearing the original position and the saved time and/or movement data before the step of activating the next nearest controller. If the motion of the cursor/arrow is not consistent with a function of any next nearest controller, the method may comprise selecting the first controller to control the at least one window.

The invention may also be considered an apparatus to control a computer window display environment comprising a microprocessor; a semiconductor memory connected to the microprocessor; a computer output display capable of displaying at least one window having a pointer on the display; a computer input device to control the motion of the pointer on the display and to activate at least one function of the window; an operating system having a window manager to manage the computer window display environment; a position recorder to record the original position of the pointer when a user activates at least one function of the window with the computer input device; a movement recorder to record the movement of the pointer when the user moves the pointer across the window with the computer input device; a motion evaluator to evaluate the movement of the pointer; and a window controller selector to select a second or subsequent window controller when the movement of the pointer is not consistent with a first window controller corresponding to the original position.

The invention is also a program product for use with a computer operating system having a windowing display environment, the program product comprising a signal-bearing medium carrying thereon a window controller selector further comprising a cursor/arrow position detector which detects the original position of a cursor/arrow on a window; a movement recorder to track the motion of the cursor/arrow on a window; a window controller selector choosing a first of a plurality of window controllers, the first window controller corresponding to the original position of the cursor/arrow; a movement/controller discriminator discerning whether the motion of the cursor/arrow is consistent with one of the plurality of selected window controllers and, if not, the window controller selector chooses the next nearest window controller not previously selected but still within a threshold distance of the original position; but if the movement/controller discriminator did discern that the motion of the cursor/arrow was consistent with one of the selected window controller, a window manager passes data from the cursor/arrow position detector and the movement recorder to the next window controller.

The invention may also be an apparatus to select a window controller in a computer windowing interface display, comprising means to display at least one window having a cursor/arrow; means to activate one of a plurality of functions associated with the at least one window; means to select the first controller associated with a position of the cursor/arrow on the at least one window; means to determine that a movement of the cursor/arrow is not consistent with a function of the first controller; means to select the next nearest controller within a threshold distance to an original position of the cursor/arrow on the at least one window; means to determine if the movement of the cursor/arrow is consistent with a function of the next nearest controller; if so, the apparatus further comprises means for the next nearest controller to control the window. The apparatus may further comprise means to repeat the function associated with the means to select the next nearest controller within a threshold distance to an original position of the cursor/arrow on the at least one window and the means to determine if the movement of the cursor/arrow is consistent with a function of the next nearest controller if the movement of the cursor/arrow is not consistent with a function of the next nearest controller until no next nearest controller within the threshold distance of the original position of the cursor/arrow has a function consistent with the movement of the cursor/arrow; and a means to default control of the window to the first controller.

BRIEF DESCRIPTION OF THE DRAWING

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying Drawing, wherein:

DETAILED DESCRIPTION OF THE INVENTION

Figure 1:
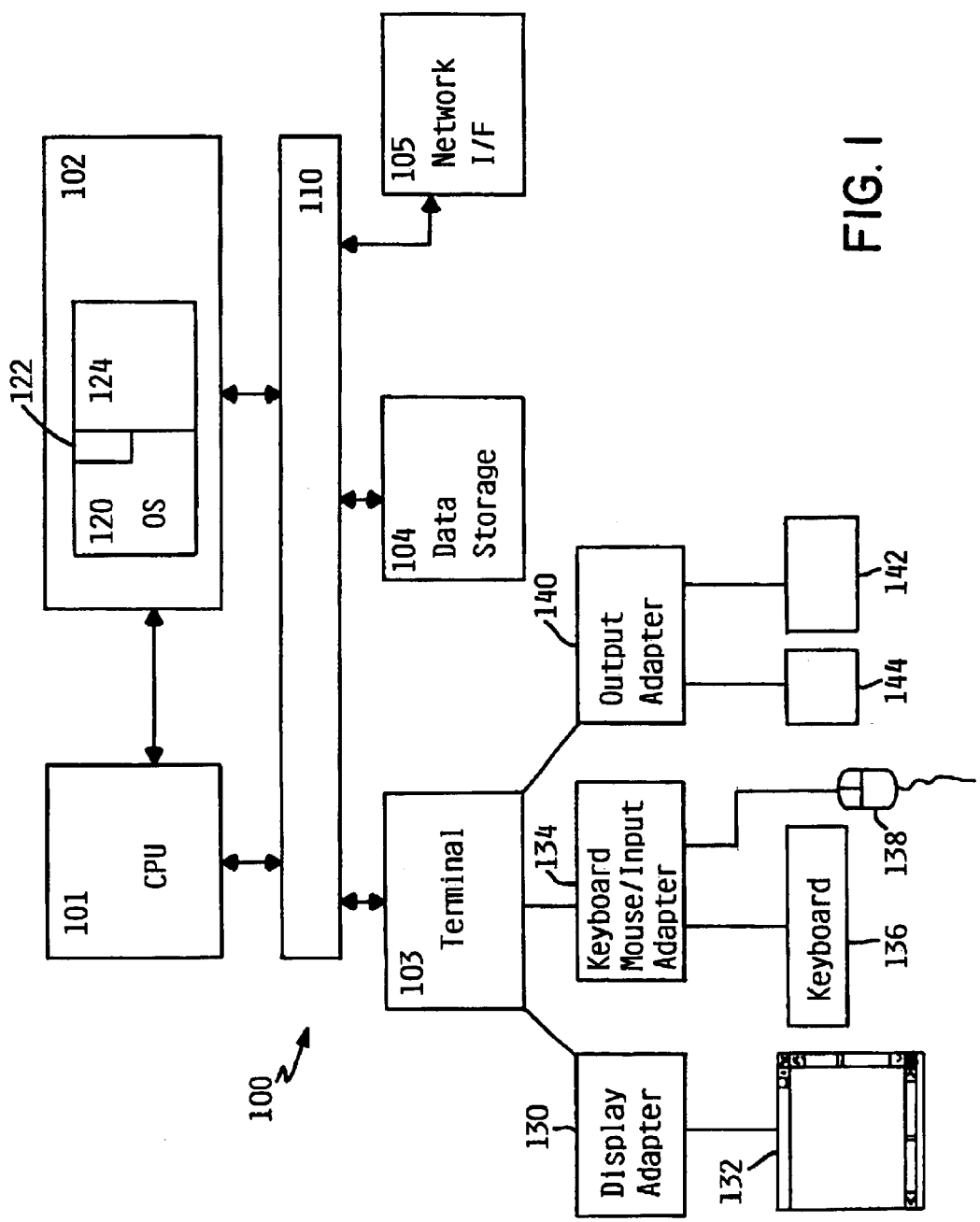
FIG. 1 is a high-level block diagram of a computer system capable of implementing the preferred embodiment of the invention.

Referring to the Drawing, wherein like numbers denote like parts throughout the several views, FIG. 1 shows a high-level block diagram of a computer system 100, consistent with the preferred embodiment. Computer system 100 comprises central processing unit (CPU) 101, main memory 102, terminal interface 103, data storage 104, and network interface 105. The various devices communicate with each other via internal communications bus 110.

CPU 101 is a general-purpose programmable processor, executing instructions stored in memory 102; while a single CPU is shown in FIG. 1, it should be understood that computer systems having multiple CPUs could be used. CPU is suitably programmed to carry out the preferred embodiment of the invention using a window manager 122 and the several window controllers usually part of each application program 124 stored in memory, as described in more detail in the flowcharts of the figures. In the alternative, the function of figures could be implemented by control circuitry through the use of logic gate, programmable logic devices, or other hardware components in lieu of a processor-based system. Memory 102 is a random-access semiconductor memory for storing data and programs; memory 102 is shown conceptually as a single monolithic entity, it being understood that memory may be arranged as a hierarchy of caches and other memory devices. Operating system 120 and applications 124 reside in memory 102. Operating system 120 may provide, inter alia, functions such as device interfaces including a window manager 122 for operating in a windowing environment, management of memory pages, management of multiple tasks, etc. as is known in the art. Applications 124 include programs for the user to accomplish tasks, e.g., word processing, spread sheet, browser which provides a user-interface to the world wide web. Some applications 124, including the browser may be integrated into operating system 120. Window controllers for each application may be within its respective application 124 or may be part of the operating system 120. The window manager 122 directs the window event to the appropriate window controller.

Communications bus 110 supports transfer of data, commands and other information between different devices; while shown in simplified form as a single bus, it is typically structured as multiple buses; and may be arranged in a hierarchical form. Terminal interface 103 may support the attachment of a single or multiple terminals, and may be implemented as one or multiple electronic circuit cards or other units. Connected to the terminal interface 103 may be a display adapter 130 supports video display 132, which may be a cathode-ray tube display or a touch panel, although other display technologies may be used. Keyboard/pointer adapter 134 supports keyboard 136 and pointing device 138, depicted as a mouse; it being understood that forms of input pointer devices other than keyboard 136 and mouse 138 could be used. Output adapter 140 may support a printer 142 or an speaker 144 or other output devices. Data storage 104 preferably comprises one or more magnetic or optical disk drive units, although other types of data storage could be used. Network interface 105 provides a physical connection for transmission of data to and from a network of computers including the Internet and could use any various available technologies. This interface 105 may comprise a modem connected to a telephone line, through which an Internet access provider or on-line service provider is reached, but increasingly other higher bandwidth interfaces are implemented. For example, computer system 100 may be connected to a local mainframe computer system via a local area network using an Ethernet, Token Ring, or other protocol, the mainframe in turn being connected to the Internet. Alternatively, Internet access may be provided through cable TV, wireless, or other types of connection. The computer system shown in FIG. 1 is intended to be a simplified representation, it being understood that many variations in system configuration are possible in addition to those specifically mentioned here. While system 100 could conceivably be a personal computer system, the server may also be a larger computer system such as an IBM Enterprise System or an IBM AS/400 system.

Computer 100 need not be an enterprise server system; it may be a smaller computer system, such as notebook or laptop computer. Finally, computer system 100 need not be a self-contained computer at all, but may be a simpler appliance-like client devices with less memory. It is fully intended that computer system 100 include any electronic device which is capable of interacting with a user through a windows environment. The convergence of computing, telecommunications and consumer electronics is causing a tremendous growth in the number and variety of mobile computer systems 100, examples of which is not intended to be exhaustive but merely exemplary, include a network terminal or a thin client or other terminal-like devices having smaller memory; voice response units (VRUs); terminals; world wide web browsers; and even pervasive mobile devices, such as personal digital assistants, pagers, and cell-phones. Such special-purpose devices for accessing the world wide web, such as an Internet access box for a television set, or a portable wireless web accessing device, which can implement a plurality of windows user-interfaces for the purpose of invoking and executing an application is intended to be within the scope of a computer system 100.

As will be described in detail below, aspects of the preferred embodiment pertain to specific method steps implementable on a computer system 100. In an alternative embodiment, the invention may be implemented as a computer program-product for use with a computer system 100. The programs defining the functions of the preferred embodiment can be delivered to the computer 100 via a variety of signal-bearing media, which include, but are not limited to: (a) information permanently stored on non-writable storage media, e.g., read only memory devices within either computer such as CD-ROM disks readable by CD-ROM drive 214; (b) alterable information stored on writeable storage media, e.g., floppy disks within diskette drive or hard-disk drive, such as shown as 214 in FIG. 2; or (c) information conveyed to a computer by a telephone or a cable media network, including wireless communications. Such signal-bearing media, when carrying computer-readable instructions that direct the functions of the present invention, represent alternative embodiments of the present invention.

Figure 2:
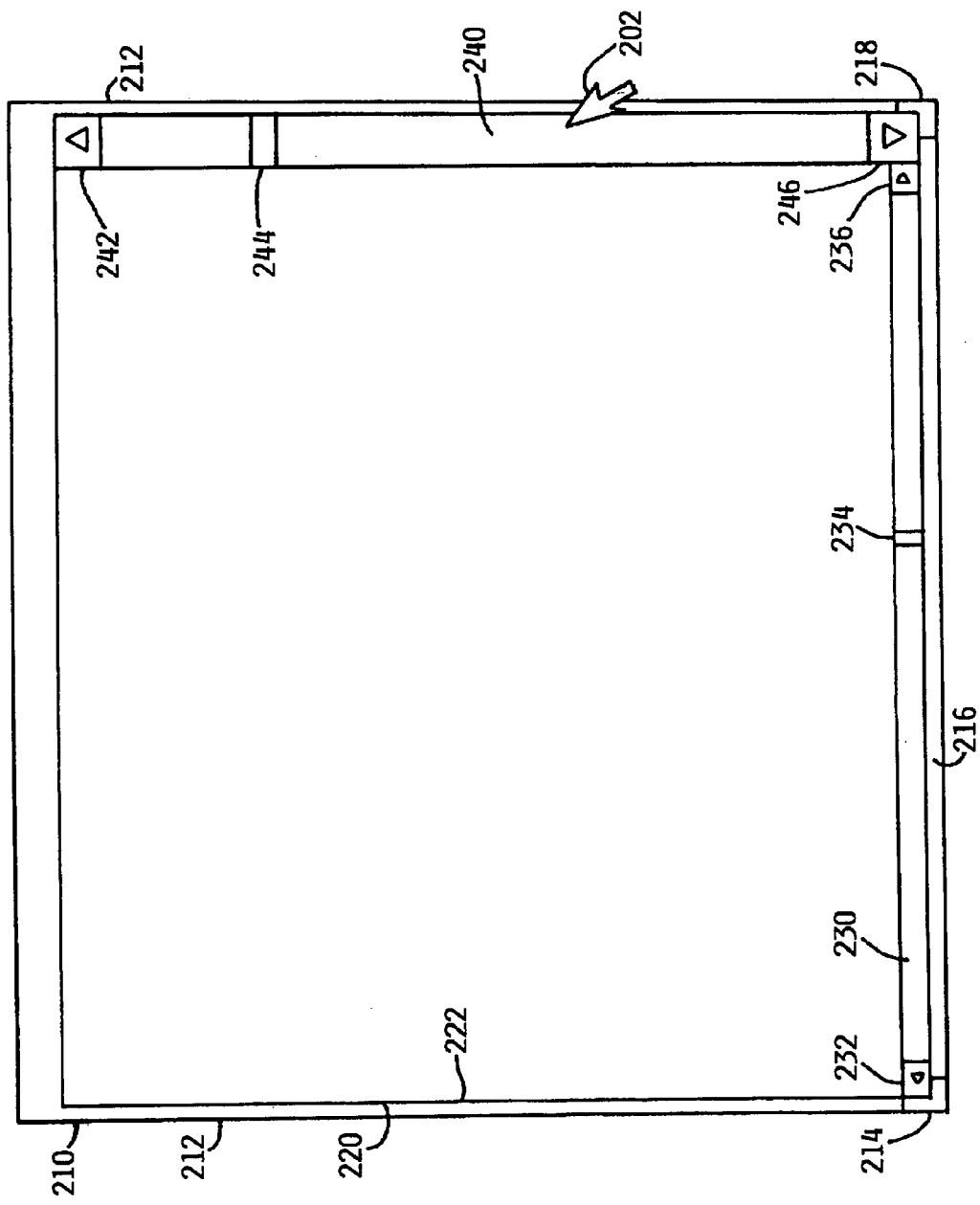
FIG. 2 is a simplified illustration of several functions of a windowing user-interface on a computer display.

FIG. 2 is a simplified representation of what a user might expect to see on a computer monitor or display when using an operating system having a windowing user-interface. Operating system and the window manager control the windowing user-interface as instructions are executed by the CPU. A pointer, usually a cursor or screen arrow, 202 moves freely around the screen and is manipulated by a mouse, a joy stick, or other device. One window 210 is shown and may represent a software application program. The invention is equivalently applicable to controllers within different windows. Many window features not relevant to the invention have been omitted for ease of discussion and understanding. Window 210 has a vertical border 212. By placing a cursor or arrow using a mouse or other input device along the vertical border and moving the mouse in a horizontal direction, the size of the window 210 may increase or decrease according to the motion of the cursor. Typically, what happens is that once the cursor is placed on the vertical border 212, a double-headed horizontal arrow⇆appears indicating that the window resize controller can be activated to resize the window according to the motion of the cursor/arrow when, e.g., clicking and dragging a mouse or other input device. Other features of window 210 are the small blocks 214 and 218. Once the arrow is on or in the very close proximity of the blocks, diagonal double-headed arrows will appear indicating that the multidirectional resize controller of the window can be activated by, e.g., pressing a mouse button, and the window 210 can be resized in the direction of the cursor movement. Similar to the vertical border 212, when the cursor or arrow is placed on or very near the horizontal border 216, a vertical double-headed arrow ↕ also appears indicating that the window resize controller can be activated and that the window 210 can be resized in the vertical direction.

Window 210 shows two scroll bars 230 and 240. Horizontal scroll bar, 230 has two end blocks 232 and 236 with a horizontal position indicator 234. End block 232 typically represents the far left margin or edge of the material within the window whereas end block 236 represents the far right margin or end of the window. By placing the cursor or arrow 202 on horizontal position indicator 234 and clicking and dragging the indicator 234 within the scroll bar 230, the horizontal controller within the window manager adjusts the horizontal view within window 210 from left to right according to the motion of the mouse or other input device. Similarly vertical scroll bar 240 has a top boundary block 242 usually indicating the beginning or top of the material within window 210 and a bottom boundary block 246 usually representing the end or the bottom of the material within window 210. By placing a cursor or arrow 202 using a mouse or other motion device on the vertical position indicator 244 and dragging it in a vertical direction within the scroll bar 240, the vertical motion controller of the window manager is activated and material is scrolled from beginning to end or vice versa adjusting the display of the material accordingly.

A problem arises because one window controller, e.g., the position indicator 244, is often in very close proximity to another window controller. A user may actually intend to scroll the material by clicking and dragging the arrow/cursor 202 on the scroll bar position indicator 234 or 244 but the window resize controller may take effect because the user missed and will interpret the motion as one of clicking and dragging on the boundary and will resize a window accordingly. To remedy the situation, what has been invented is an automated method, apparatus, and program product of a controller selector which detects and resolves which controller controls the activate and movement events because those events are consistent with or are expected by the selected controller.

Figure 3:
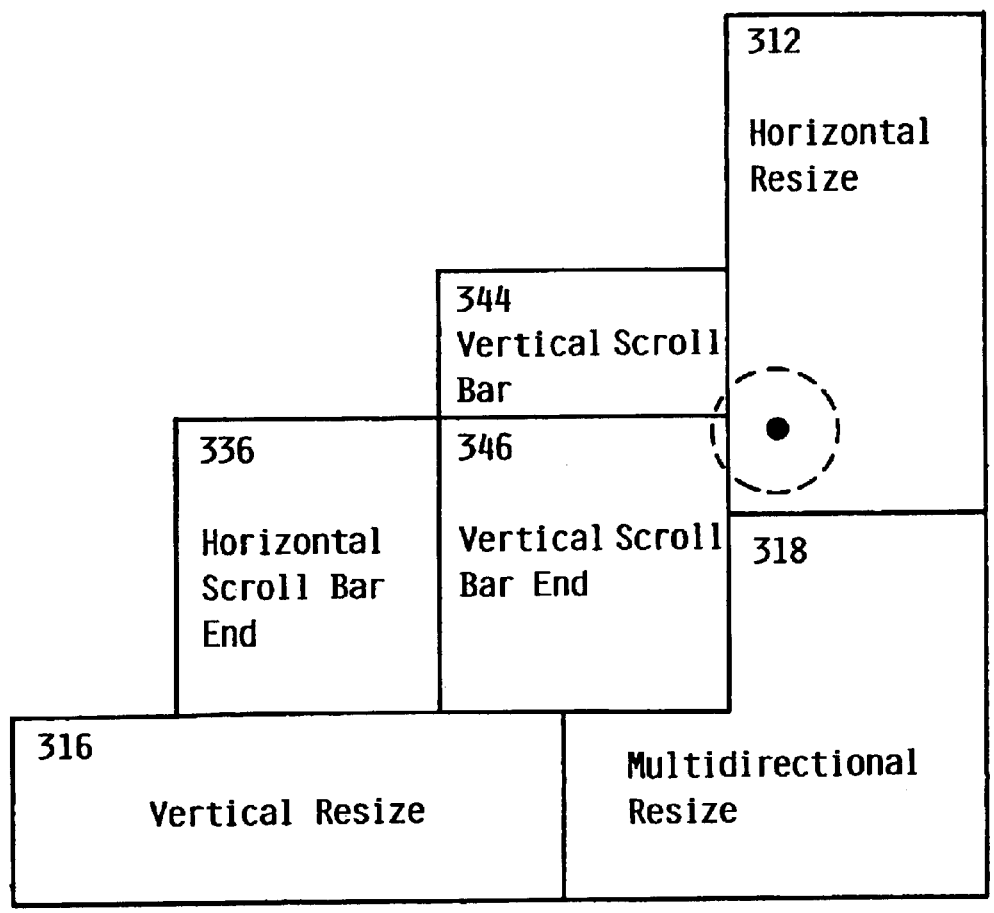
FIG. 3 is a simplified illustration of several window controllers located adjacent to and/or in close proximity to each other.

FIG. 3 illustrates some basic principles regarding the preferred embodiment of the invention. Shown in FIG. 3 are six window controllers 336, 344, 346, 316, 312, and 318 each associated with its respective window control feature of FIG. 2 and all within close proximity to each other. Some controllers, moreover, may have been omitted. The controllers of FIG. 3 may be imagined as being superimposed underneath the lower right hand corner of FIG. 2, i.e., by moving the cursor/arrow 202 to the window feature and performing a click or other activate event, the corresponding controller of the feature will take control of the window. For example, horizontal scroll bar end controller 336 of FIG. 3 controls the actions of the end block 236 of the horizontal scroll bar 230 of FIG. 2; vertical scroll bar controller 344 (FIG. 3) controls the window when the vertical position indicator 244 is vertically scrolled in the scroll bar 240 (FIG. 2); vertical scroll bar end controller 346 (FIG. 3) controls the display when the cursor/arrow 202 is place on the vertical end block 246 (FIG. 2); vertical window resize controller 316 (FIG. 3) controls the vertical window resize function associated with border 216 of window 210 (FIG. 2); horizontal window resize controller 312 (FIG. 3) controls the horizontal window resize function of border 212 of window 210 (FIG. 2); and window multidirectional resize controller 318 (FIG. 3) controls the function to resize the window in several concurrent directions associated with the block in the lower right-hand corner 218 of window 210 (FIG. 2). Other controllers, although present, are not illustrated nor discussed but would be pertinent to the method described herein. p To illustrate the existing dilemma and the solution offered by the invention, consider the following: if a cursor/arrow is on the position labelled A in FIG. 3 the horizontal resize controller 312 for window 210 would take control. Imagine, however, that the user actually wanted to scroll through the window by moving the cursor/arrow up, i.e., the user really wanted to activate the vertical scroll bar controller 344. Instead, if there was a slightest motion in the horizontal directions the window would be resized. The features of the invention that will correct the error in selecting the appropriate controller is that first, by default, the horizontal resize controller 312 will take control of the window because the activate event, e.g., clicking a mouse button, at position A is within the purview of the horizontal resize controller 312. Now, however, because the movement event, i.e., the motion of the cursor/arrow, is in a upward direction that is inconsistent with the actions controlled by the horizontal resize controller 312, the next closest controller will take control. In this case, position A is next closest to the vertical scroll bar end controller 346 which will then take control of the window. If the movement event is still inconsistent with the next closest controller, as is the case here because the vertical scroll bar end controller doesn't recognize movement events, the next closest controller, i.e., the vertical scroll bar controller 344, takes control. The movement event, i.e., the upward dragging of the cursor/arrow on the display, is consistent with motion controlled by the vertical scroll bar controller 344 so the vertical scroll bar controller 344 assumes control of the window. A feature of the invention then is that it selects the closest controller that is consistent with the motion of the cursor/arrow on the screen. The distance used to select the closest and the next closest controller may vary depending upon the displays, the size of the cursor/arrows, and the controllers but typically involve distances of only one-eighth to one-quarter inch. For instance, in FIG. 3, an area has been drawn around position A indicating that only those controllers intersecting with the area would be considered. Vertical resize controller 316 for window 210 for which a vertical upward motion would be consistent is too far away to reasonably be considered.

Figure 4A:
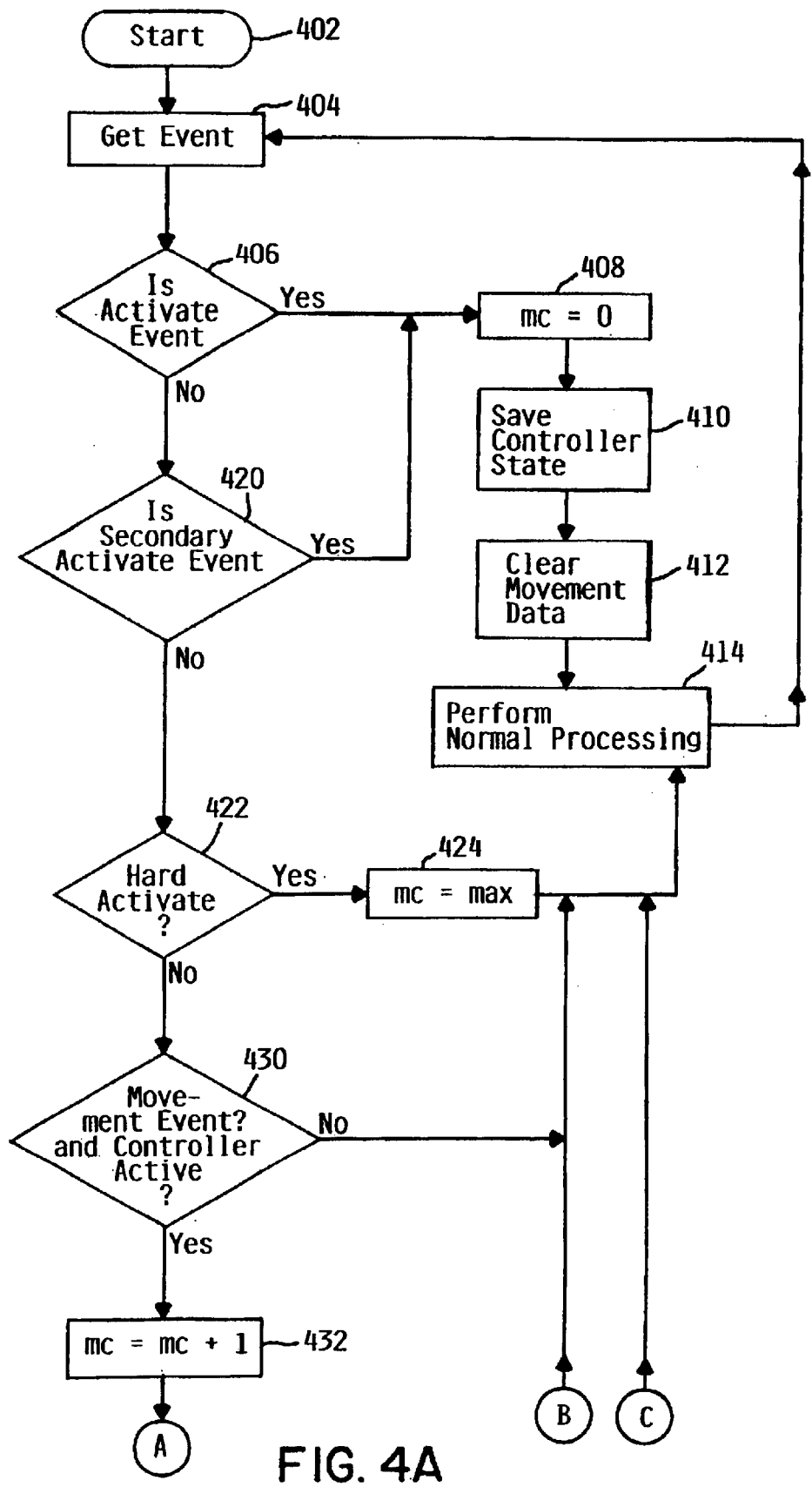
FIG. 4 is a simplified flow chart of a method to select one of several window controllers consistent with the motion of the display pointer in accordance with one embodiment of the invention. It is suggested that FIG. 4 be printed on the face of the patent.
Figure 4B:
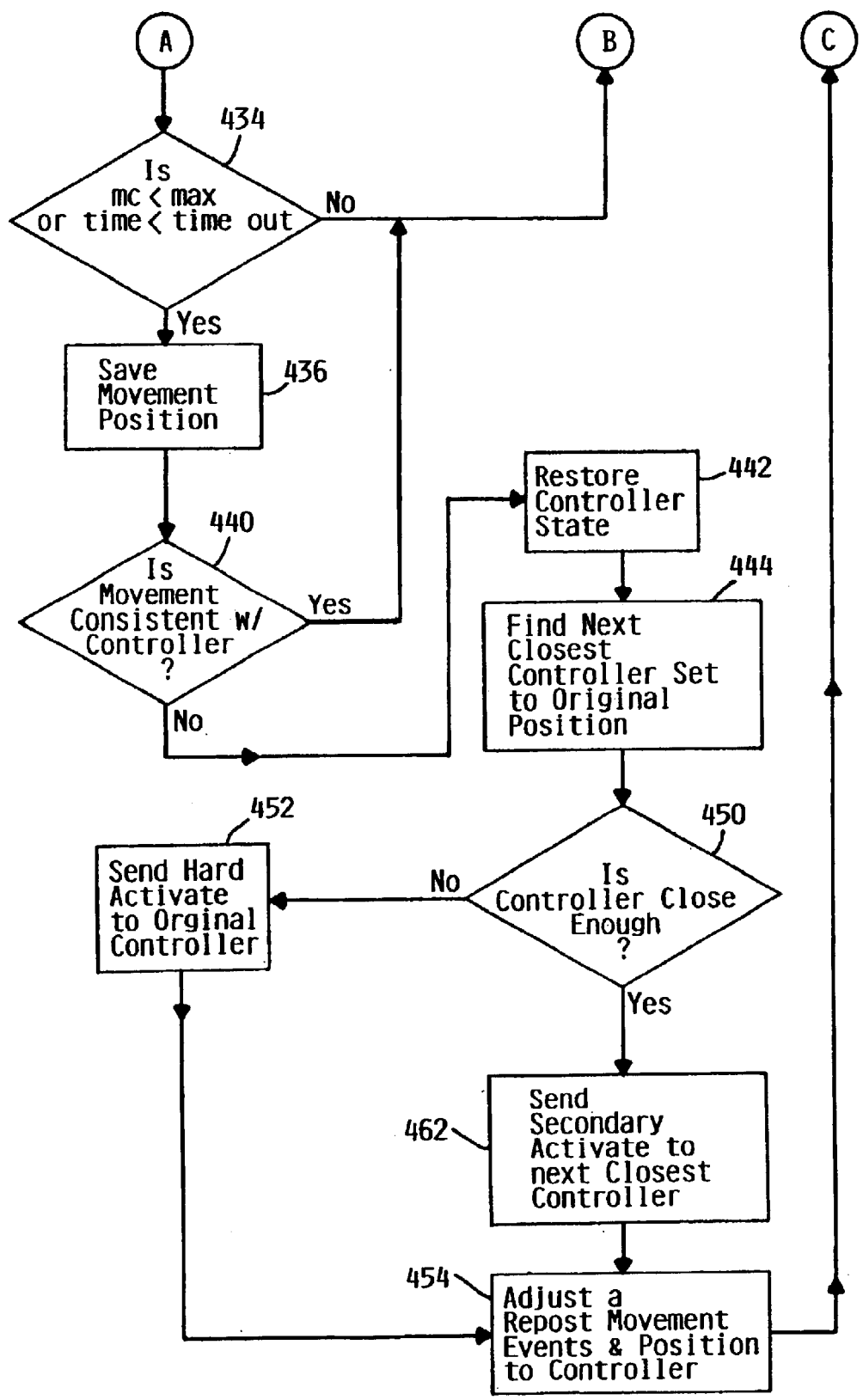

FIG. 4 is a simplified flow chart of the method performed by the controller selector consistent with the invention to select the controller to control the window based on the activate event and the movement event, i.e., the direction of motion of the cursor/arrow. The procedure of FIG. 4 is preferably embodied in window procedures which may be a part of the operating system or may be a part of the specific application. The window manager notices user input events such as a single or double click of a mouse and directs the input events to the appropriate controller. The window manager is initiated at step 402. At step 404, the window manager detects an action performed by a user. At step 406, the window manager determines if the action qualifies as an activate event for a particular controller and will send the event to that controller which becomes the default or original controller. Some controllers require only a single click, others require a double click or other action as an activate event. If the event is an activate event for the original or default controller, a movement count is set to zero in step 408 and the state of activated controller is saved in step 410. The movement count keeps track of the data points and/or the time passing since the activate event because after some programmable number of data points or amount of time in which the motion has been consistent with the selected controller, the controller selector assumes that it has selected the correct controller and it is unnecessary to track further events. Nevertheless, it may be determined though that the function of the original or default controller is inconsistent with the motion of the user in which case it may be necessary to pass the traced motion/time to the next controller and/or restore the original position. In step 412, movement data associated with a previous activate and movement event is cleared and normal processing dependent upon the received event ensues in step 414. To briefly summarize the process steps represented by the loop from step 406 through 414, the window manager sent the activate event to a controller which upon receiving the new activate event set its movement count to zero, saved its state, and cleared any previous events, and processed the activate event as being consistent with the selected controller.

If the event is not an activate event for original/default controller in step 406, the process of the invention then seeks to establish whether the event is a secondary activate event. A secondary activate event is one which passes data, such as the original or default controller, the original position of the cursor/screen arrow, the direction of motion, the movement or time count, etc. The data that is passed may be programmable depending upon the events controlled by a controller. If the event is a secondary activate event which passes data, the movement count is set to zero, the controller state is saved, movement data is cleared and normal processing is performed as in steps 408, 410, 412, and 414, respectively.

In step 420, if the user action is neither an activate event nor a secondary activate event, then the controller selector determines that there are no further controllers relevant to the events and some action must be accomplished in response to the user's action as in step 422, referred to as a hard activate event. A hard activate occurs when all the closest and next closest controllers to the position of the cursor/arrow have declined to take control of the event and so by default, the control returns to the original or default controller. When the controller selector determines that a hard activate must occur, then at step 424, the movement count is set to infinity or some other maximum number so that the movement is not tracked and normal processing ensues as in step 414.

If, however, at step 422, the event is not a hard activate event, the controller selector determines in step 430 if the event is a movement event, such as a click and drag or other movement event and if the controller is active. If the event is not a movement event or if the controller is not active, normal processing occurs for the other events, as in step 414. If, however, the event is a movement event involving motion of the cursor/arrow or other screen indicator and if the controller is active, the movement is tracked, as position and/or time data points, and incremented in step 432. At step 434, the controller selector checks if the incremented movement is within the maximum number of allowable position and/or time data points as determined by what is appropriate to the controller. For instance, a window resize controller has much fewer acceptable positions than a window movement controller. If the time and/or position is within the normal parameters of the controller, then at step 436, the position of the cursor/arrow is saved as movement data. At step 440, the direction of motion of the movement event is verified for consistency with the function of the controller.

If the motion is consistent, then the appropriate controller was selected and normal processing occurs, as in step 414.

Herein is an important feature of the invention: the subsequent motion of the cursor/screen arrow is considered when selecting the controller. For instance, if a user wishes to vertically scroll through material displayed on a window but the controller selector has activated the horizontal window resize controller, the motion of moving the cursor/screen arrow either up or down by the user is inconsistent with the motion of moving the window border to the left or right. The controller selector, therefore, consistent with the process steps of the invention up to this point in the description determines that it is not the horizontal window resize controller that is the correct controller to be activated. There are several consistency algorithms which can determine whether the motion is consistent or inconsistent with the activated controller's function. A first example of a consistency algorithm is to examine only the first and the last positions of the movement event and determine if the vector between the end points of movement event is consistent with the activated controller. Another possible consistency algorithm would be looking at all the saved movement positions and determining if the slope of any straight line motions or other more complex vector calculations were in a geometry consistent with the controller. Yet, another example of a consistency algorithm could be as simple as determining that the window resize controller is expecting a vertical motion rather than a horizontal motion; therefore a horizontal motion is inconsistent with vertical resizing.

If the motion of the cursor/screen arrow is not consistent with the function associated with the controller, as in step 440, then the state of the controller is restored as in step 442. In step 444, the next closest controller to the cursor/arrow is selected and the controller selector checks at step 450 if the next closest controller is reasonably close enough to the position of the cursor/screen arrow. If it is not close enough as in step 450, then a message is generated for the original controller to promulgate a hard activate, as in step 452. At this time, the position of the cursor/arrow is adjusted to return to the original position, as in step 454, and the process cycles through steps 404, 406, 420 to step 422 where it is determined that a hard activate will occur.

If at step 450, however, the next closest controller is a reasonably close enough to the original position of the cursor/arrow, then at step 462, a secondary activate is sent to the next closest controller and at step 454, the original pointer position and movement counts are displaced and otherwise adjusted and reposted to the selected next closest controller as if the activate and movement event occurred within the area of the next closest controller . The process then loops back to step 414 for normal processing.

In this fashion, the selection of a controller is based upon the motion of the cursor/screen arrow. Windows can overlay each other on a display and so the window manager may actually process several iterations of the method steps of FIG. 4 before the appropriate controller is determined.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

What is claimed is:

1. A method to select a window controller when a user is moving a cursor/screen arrow in a computer window display having at least one window, said method comprising the steps of:

(a) moving the cursor/screen arrow to an original position;

(b) activating a first controller;

(c) determining that the cursor/arrow was moved in a direction not consistent with a function controlled by the first controller;

(d) activating a next nearest controller;

(e) determining if the direction of motion of the cursor/arrow is not consistent with a function of the next nearest controller; and (f) if the direction of motion is not consistent with a function of the next nearest controller, repeating steps (d) and (e) until the direction of motion of the cursor/arrow is consistent with a function of the next nearest controller;

(g) automatically selecting the next nearest controller having the function consistent with the direction of motion of the cursor/arrow to control the at least one window.

2. The method of claim 1, further comprising:

(a) saving the original position of the cursor/arrow when the first controller was activated; and (b) saving the time and/or movement of the cursor/arrow during step (c) of claim 1.

3. The method of claim 2, further comprising:

(a) determining that the next nearest controller is within a threshold distance of the original position.

4. The method of claim 3, further comprising:

(a) passing the original position and saved time and/or movement to the next nearest controller; and (b) displacing the original position as if it were just within the boundary of the next nearest controller nearest to the original position.

5. The method of claim 3, further comprising;

(a) clearing the original position and the saved time and/or movement data before said step of activating the next nearest controller.

6. The method of claim 1, further comprising automatically selecting the first controller to control the at least one window if the motion of the cursor/arrow is not consistent with a function of any next nearest controller.

7. An apparatus to control a computer window display environment, comprising:

(a) a microprocessor;

(b) a semiconductor memory connected to the microprocessor;

(c) a computer output display capable of displaying at least one window having a pointer on the display;

(d) a computer input device to control the motion of the pointer on the display and to activate at least one function of the window;

(e) an operating system having a window manager to manage the computer window display environment;

(f) a position recorder to record the original position of the pointer when a user activates at least one function of the window with the computer input device;

(g) a movement recorder to record the movement of the pointer when the user moves the pointer across the window with the computer input device;

(h) a motion evaluator to evaluate the movement of the pointer;

(i) a window controller selector to automatically select a second or subsequent window controller when the movement of the pointer is not consistent with a first window controller corresponding to the original position.

8. A program product for use with a computer operating system having a windowing display environment, said program product comprising a signal-bearing medium carrying thereon a window controller selector further comprising:

(a) a cursor/arrow position detector which detects the original position of a cursor/arrow on a window;

(b) a movement recorder to track the motion of the cursor/arrow on a window;

(c) a window controller selector choosing a first of a plurality of window controllers, the first window controller corresponding to the original position of the cursor/arrow;

(d) a movement/controller discriminator discerning whether the motion of the cursor/arrow is not consistent with one of the plurality of chosen window controllers;

(e) if not consistent, said window controller selector automatically choosing a next of said plurality of window controllers not previously selected, the next window controller being next nearest to but within a threshold distance of the original position;

(f) if consistent, a window manager passing data from the cursor/arrow position detector and the movement recorder to the next window controller.

9. An apparatus to select a window controller in a computer windowing interface display, comprising:

(a) means to display at least one window having a cursor/arrow;

(b) means to activate one of a plurality of functions associated with the at least one window;

(c) means to select the first controller associated with a position of the cursor/arrow on the at least one window;

(d) means to determine that a movement of the cursor/arrow is not consistent with a function of the first controller;

(e) means to automatically select the next nearest controller within a threshold distance of an original position of the cursor/arrow on the at least one window;

(f) means to determine that the movement of the cursor/arrow is not consistent with a function of the next nearest controller;

(g) if not inconsistent, then means for the next nearest controller to automatically control the window.

10. The apparatus of claim 9, further comprising:

(a) means to repeat the function of the means to select the next nearest controller within a threshold distance to an original position of the cursor/arrow on the at least one window and the means to determine if the movement of the cursor/arrow is not consistent with a function of the next nearest controller if the movement of the cursor/arrow is not consistent with a function of the next nearest controller until no next nearest controller within the threshold distance of the original position of the cursor/arrow has a function consistent with the movement of the cursor/arrow; and (b) means to default control of the window to the first controller.

* * * * *